(12) United States Patent
Serra

(10) Patent No.: US 12,269,976 B2
(45) Date of Patent: Apr. 8, 2025

(54) FLAME RESISTANT HOTMELT ADHESIVE

(71) Applicant: H.B. Fuller Company, St. Paul, MN (US)

(72) Inventor: Joaquim Serra, Oporto (PT)

(73) Assignee: H.B. Fuller Company, St. Paul, MN (US)

( * ) Notice: Subject to any disclaimer, the term of this patent is extended or adjusted under 35 U.S.C. 154(b) by 1139 days.

(21) Appl. No.: 17/252,161

(22) PCT Filed: Jun. 13, 2019

(86) PCT No.: PCT/US2019/036901
§ 371 (c)(1),
(2) Date: Dec. 14, 2020

(87) PCT Pub. No.: WO2019/241473
PCT Pub. Date: Dec. 19, 2019

(65) Prior Publication Data
US 2021/0284872 A1    Sep. 16, 2021

Related U.S. Application Data

(60) Provisional application No. 62/684,968, filed on Jun. 14, 2018.

(51) Int. Cl.
| | | |
|---|---|---|
| C09J 7/35 | (2018.01) | |
| A47L 15/42 | (2006.01) | |
| B05D 3/00 | (2006.01) | |
| C08G 18/24 | (2006.01) | |
| C08G 18/36 | (2006.01) | |
| C08G 18/48 | (2006.01) | |
| C08G 18/66 | (2006.01) | |
| C08G 18/76 | (2006.01) | |
| C08K 3/26 | (2006.01) | |
| C08K 3/30 | (2006.01) | |
| C08K 3/32 | (2006.01) | |
| C08K 5/01 | (2006.01) | |
| C08K 5/3435 | (2006.01) | |
| C08K 5/5357 | (2006.01) | |
| C08K 9/04 | (2006.01) | |
| C08L 23/12 | (2006.01) | |
| C08L 23/16 | (2006.01) | |
| C08L 23/26 | (2006.01) | |
| C08L 51/06 | (2006.01) | |
| C08L 91/06 | (2006.01) | |
| C09D 175/08 | (2006.01) | |
| D06F 37/20 | (2006.01) | |
| D06F 49/06 | (2006.01) | |

(52) U.S. Cl.
CPC ............ *C09J 7/35* (2018.01); *A47L 15/4251* (2013.01); *B05D 3/007* (2013.01); *C08G 18/242* (2013.01); *C08G 18/36* (2013.01); *C08G 18/4845* (2013.01); *C08G 18/6696* (2013.01); *C08G 18/7671* (2013.01); *C08K 3/26* (2013.01); *C08K 3/30* (2013.01); *C08K 3/32* (2013.01); *C08K 5/01* (2013.01); *C08K 5/3435* (2013.01); *C08K 5/5357* (2013.01); *C08K 9/04* (2013.01); *C08L 23/12* (2013.01); *C08L 23/16* (2013.01); *C08L 23/26* (2013.01); *C08L 51/06* (2013.01); *C08L 91/06* (2013.01); *C09D 175/08* (2013.01); *D06F 37/20* (2013.01); *D06F 49/06* (2013.01); *C08K 2003/265* (2013.01); *C08K 2003/3045* (2013.01); *C08K 2003/323* (2013.01); *C08L 2201/02* (2013.01); *C08L 2201/08* (2013.01); *C08L 2205/02* (2013.01); *C08L 2205/035* (2013.01); *C08L 2314/06* (2013.01); *C09J 2301/304* (2020.08); *C09J 2301/312* (2020.08); *C09J 2301/408* (2020.08); *C09J 2301/414* (2020.08); *C09J 2423/10* (2013.01); *C09J 2423/16* (2013.01)

(58) Field of Classification Search
None
See application file for complete search history.

(56) References Cited

U.S. PATENT DOCUMENTS

| | | | |
|---|---|---|---|
| 2003/0105259 A1* | 6/2003 | Heemann | C09J 161/00 527/600 |
| 2003/0109736 A1* | 6/2003 | Onchi | C07F 9/65748 558/156 |
| 2005/0054780 A1* | 3/2005 | Zhou | C09J 123/10 525/240 |
| 2008/0241529 A1 | 10/2008 | Bauer et al. | |
| 2016/0032045 A1* | 2/2016 | Diehl | C08G 18/4684 524/603 |
| 2016/0137793 A1* | 5/2016 | Schneider | B29C 65/4815 156/334 |
| 2019/0177520 A1 | 6/2019 | Winterhof et al. | |

FOREIGN PATENT DOCUMENTS

EP         3299431         3/2018

* cited by examiner

Primary Examiner — Scott R. Walshon
Assistant Examiner — Thomas A Mangohig
(74) Attorney, Agent, or Firm — Daniel Barta

(57) ABSTRACT

A hotmelt adhesive composition comprising 15 to 45% by weight of at least one tackifying resin, and 20 to 60% by weight of a mixture of at least one single-site catalyzed propylene homopolymer (A) and at least one propylene copolymer (B), wherein the propylene homopolymer (A) has a weight average molecular weight of 20,000 to 145,000, the propylene copolymer (B) has an ethylene comonomer content of 5 to 25% by weight, and the weight ratio of propylene homopolymer (A) to propylene copolymer (B) is from 1:3 to 3:1, wherein the hotmelt adhesive further comprises at least one of the following two components (a) and (b): (a) a particulate phosphorous based compound in an amount of 15 to 40% by weight, or (b) a room temperature liquid phosphorous based compound in an amount of 4 to 15% by weight.

20 Claims, No Drawings

FLAME RESISTANT HOTMELT ADHESIVE

FIELD OF THE INVENTION

The present invention relates to a hotmelt adhesive composition comprising at least one tackifying resin, a mixture of at least one single-site catalyzed propylene homopolymer and at least one propylene copolymer, at least one of a phosphorous based compound. The invention further relates to an article comprising the hotmelt adhesive. The invention also relates to a method of bonding a first base material to a second base material by means of the hotmelt adhesive.

BACKGROUND OF THE INVENTION

Hotmelt adhesives are solvent-free adhesives and have the characteristic that instant bonding and high-speed bonding can be achieved since adhesiveness is exhibited after the adhesive is melted by heating and coated onto an adherent, followed by cooling to solidify the adhesive, and therefore has been used in a wide range of fields. At present, various hotmelt adhesives for use in various applications have been developed and supplied to the market.

Adhesive composition components such as base polymers, tackifiers, waxes, functionalized polyolefins and oils are customarily provided as separate components for formulation into hotmelt adhesive compositions. In some applications, hotmelt adhesive compositions are sought that provide a desired combination of flame resistance, good adhesion and a high bonding strength at room temperature and elevated temperature, an adjusted softening point, and a long open time.

Amorphous poly-α-olefin (APAO) based materials are commonly used polyolefins for hotmelt adhesives. With APAO based polymers, it is possible to achieve acceptable heat resistance and adhesion properties.

The main issues with APAOs are related with residual tack of the polymer creating agglomeration problems, high softening points which imply high application temperatures and a low setting speed. Additionally, although presenting bondings with high heat resistance in unstressed conditions, the APAOs tend to lose cohesion when some temperature (above room temperature) is applied, with the loss of bonding strength under stressed conditions.

Attempts have been made to address some of the above problems by using metallocene technology based polymeric materials. However, such hotmelt adhesives often have low viscosity levels, poor heat resistance of the bonded materials or poor setting characteristics.

In some application fields where long open time and low softening points are desired, a high flame resistance is also needed. For example, building elements for navy construction or thermal insulation panels for buildings or are required to have high flame resistance. These thermal insulation panels are laminated using hotmelt adhesives. Therefore, hotmelt adhesives used in this area also desirably should have a high flame resistance, because otherwise the flame resistance of the insulation panel is partly nullified. In addition to high flame resistance, hotmelt adhesives in such application fields should desirably maintain bonding strength at elevated temperatures such that in case of fire the bonding does not collapse before counteractive measures can be taken. The latter requirement somewhat collides with the desire for a low softening point. Therefore, it is difficult to find compositions having at the same time a good balance of conflicting properties.

Hotmelt adhesives having flame resistance can be obtained by introducing flame retardants into the adhesive composition. However, the presence of high amounts of non-adhesive components may impair the resulting adhesion properties. Furthermore, some flame retardants are based on halogen-containing materials which increasingly are banned from use due to the negative impact in human health and in the environment. Therefore, it is a difficult task to select sufficiently effective flame retardants suitable to be used in hotmelt adhesives. More importantly, it is difficult to find a combination of components providing the desired adhesion properties over a broad temperature range even in the presence of sufficient amounts of a selected flame retardant or a synergistic combination of special flame retardants or additives.

Thus, there is a need in the art for flame retardant hotmelt adhesive compositions having a long open-time, good adhesion properties even at elevated temperature, and low softening points.

The object of the present invention is to meet the above needs.

SUMMARY OF THE INVENTION

The present invention provides a hotmelt adhesive composition comprising, based on the total weight of the composition:
(i) 15 to 45% by weight of at least one tackifying resin, and
(ii) 20 to 60% by weight of a mixture of at least one single-site catalyzed propylene homopolymer (A) and at least one propylene copolymer (B), wherein the propylene homopolymer (A) has a weight average molecular weight of 20,000 to 145,000, the propylene copolymer (B) has an ethylene comonomer content of 5 to 25% by weight, and the weight ratio of propylene homopolymer (A) to propylene copolymer (B) is from 1:3 to 3:1,
wherein the hotmelt adhesive further comprises
(iii) at least one of the following two components (a) and (b):
(a) a particulate phosphorous based compound in an amount of 15 to 40% by weight, or
(b) a room temperature liquid phosphorous based compound in an amount of 4 to 15% by weight.

The present invention also provides an article comprising a first base material and a second base material, and a layer of the above hotmelt adhesive composition in-between the first and second base material.

In addition, the present invention provides a method of bonding a first base material to a second base material, the method comprising the steps of melting the above hotmelt adhesive, coating the adhesive on at least one base material, and bonding the other base material to the coated hotmelt adhesive.

Further embodiments of the present invention are described in the following detailed description and the appended claims.

DETAILED DESCRIPTION OF THE INVENTION

As outlined above, the hotmelt adhesive composition according to the present invention comprises 15 to 45% by weight of at least one tackifying resin and 20 to 60% by weight of a mixture of at least one single-site catalyzed propylene homopolymer (A) and at least one propylene copolymer (B), based on the total weight of the composition.

The hotmelt adhesive further comprises at least one of components (a) a particulate phosphorous based compound, or (b) a room temperature liquid phosphorous based compound. In some embodiments, only a particulate phosphorous based compound is used. In other embodiments, only a room temperature liquid phosphorous based compound is present. In a preferred embodiment, a combination of both particulate and room temperature liquid phosphorous based compound is employed.

The particulate phosphorous based compound (a) may be present in the hotmelt adhesive composition in an amount of 15 to 40% by weight, based on the total weight of the hotmelt adhesive composition. In addition or alternatively, the room temperature liquid phosphorous based compound (b) may be present in the hotmelt adhesive in an amount of 4 to 15% by weight.

The hotmelt adhesive composition according to the present invention has a high flame resistance and is free of residual tack and thus is free of agglomeration problems experienced with prior art hotmelt adhesives. Furthermore, the hotmelt adhesive of the invention features long open-time, good adhesion properties with a relatively fast set and good cold and a high heat resistance of the bonded materials. In addition, the hotmelt adhesives according to the invention have a low softening point and, therefore, can be used at lower application temperatures. The hotmelt adhesive can be applied e.g. by a slot nozzle or a roller.

The term "single-site catalyzed" as known in the art refers to propylene homopolymers or copolymers obtained from polyolefin polymerization catalysts having a single catalytic site. Single-site polyolefin polymerization catalysts are employed in the art for the provision of uniform polymers tailored structures and physical properties such as a narrow molecular weight distribution. Example of single-site catalysts include metallocene catalysts.

The term "particulate phosphorous based compound" refers in the context of the present invention to a phosphorous based compound being in solid, particulate form at room temperature or above, such as a powder. "Room temperature" in the sense of the present invention refers to 20° C. Phosphorous based compounds are known to have flame retardant properties. Particulate phosphorous based compounds are known is the art. Typical examples suitable according to the invention include polyphosphates and solid phosphonates. Polyphosphates are salts or esters of polymeric oxyanions formed from tetrahedral PO4 (phosphate) structural units linked together by sharing oxygen atoms. Polyphosphates can adopt linear or cyclic structures. In one embodiment, ammonium polyphosphate is employed as the particulate phosphorous based flame retardant according to the invention. In a preferred embodiment, encapsulated ammonium polyphosphate is used as the particulate phosphorous based compound. The ammonium polyphosphate may be encapsulated e.g. with melamine.

The term "room temperature liquid phosphorous based compound" refers in the context of the present invention to a phosphorous based compounds being a liquid at least at a temperature of about 20° C. or even at lower temperature. Liquid in this context basically means non-solid and includes viscous liquids or highly viscous liquids. Room temperature liquid phosphorous based compounds are known in the art and are commercially available. Such phosphorous based compounds typically have a phosphorous content in the range of 8 to 25% by weight, such as 15 to 23%, or even 18 to 25% by weight. Typical examples suitable according to the invention include room temperature liquid phosphonates, phosphate esters (e.g. alkyl phosphates), phosphine, phosphine oxide, and phosphates.

Phosphonates are organophosphorus compounds containing C—PO(OR)$_2$ groups, wherein R is hydrogen, alkyl or aryl, and C generally means a carbon based group providing for the carbon-phosphorous bond in the organo-phosphorous phosphonate. In a preferred embodiment of the present invention, a cyclic phosphonate is used as the room temperature liquid phosphorous based compounds. In cyclic phosphonates, both R groups as defined above are bonded together so as to form a ring, or one of the R groups may form a ring together with the carbon based group C.

Phosphate esters, i.e. esters of phosphoric acid, are widely used in the industry as plasticizers with flame retardant properties. Illustrative examples of suitable phosphate esters include but are not limited to the REOFOS and DISFLAMOLL grades marketed by Lanxess.

Alkylphosphates, i.e. esters of phosphoric acid and an aliphatic alcohol are useful due to their relatively high phosphorous content (in comparison with other phosphorous based liquid products), around 20% by weight. Illustrative examples of suitable alkylphosphates includes but is not limited to the FYROL PNX, an alkylphosphate oligomer marketed by ICL Industries.

The present invention achieves a high flame resistance even in the absence of halogen based flame retardants. Halogen-containing materials are undesired in view of environmental and health concerns. Therefore, the present invention also features flame retardant hotmelt adhesive compositions as defined herein being free from halogen-containing materials.

In some embodiments, the hotmelt adhesive composition according to the present invention further comprises a hindered amine light stabilizer. Hindered amine light stabilizers (HALS) are known in the art and are commercially available. The term refers to secondary amines having substituents involving a high degree of steric hindrance. Typically piperidine derivatives having multiple alkyl substituents in the α-positions towards the N atom are used, such as e.g. derivatives of tetramethylpiperidine. HALS are used in the art in plastics to prevent photo-oxidation. However, the present inventors have surprisingly found that HALS in combination with the room temperature liquid and/or particulate phosphorous based compounds synergistically increase the flame resistance in a hotmelt material which is an effect not related to the traditional use of HALS.

In some embodiments of the present invention, the HALS is comprised in the hotmelt adhesive composition in an amount of 0.5 to 3% by weight, based on the total weight of the hotmelt adhesive composition. In a preferred embodiment, the HALS is present in the hotmelt adhesive composition in an amount of 0.5 to 2% by weight.

The hotmelt adhesive composition according to the present invention may comprise a combination of particulate phosphorous based compounds, the room temperature liquid phosphorous based compounds or the HALS. The present inventors have found that these agents act to synergistically improve flame resistance. If a combination of particulate phosphorous based compound, the room temperature liquid phosphorous based compound and/or the HALS is used, the amount of these agents can be lower, the amount of adhesive material correspondingly can be higher resulting in better adhesion, while the resulting flame resistance still is significantly improved.

Any combination of particulate phosphorous based compound, the room temperature liquid phosphorous based compound and HALS is possible according to the present invention. In particular, in some embodiments, the present invention relates to a hotmelt adhesive composition comprising, in addition to tackifying resin and the mixture of single-site catalyzed propylene homopolymer (A) and propylene copolymer (B) as defined above, at least two components selected from the following three components (a) to (c):

(a) the particulate phosphorous based compound,
(b) the room temperature liquid phosphorous based compound, and/or
(c) the HALS.

For example, the hotmelt adhesive composition may comprise, based on the total weight of the composition, a hindered amine light stabilizer and particulate phosphorous based compounds, wherein the HALS is present in an amount of preferably 0.5 to 3% by weight, more preferably 0.5 to 2% by weight, and the particulate phosphorous based compounds is present in an amount of preferably 15 to 40% by weight, more preferably 20 to 35% by weight, even more preferably 25 to 32% by weight.

In another embodiment, the hotmelt adhesive composition comprises a hindered amine light stabilizer and room temperature liquid phosphorous based compound, wherein the HALS is present in an amount of preferably 0.5 to 3% by weight, more preferably 0.5 to 2% by weight, and the room temperature liquid phosphorous based compound is present in an amount of preferably 4 to 15% by weight, more preferably 5 to 12% by weight, still more preferably 6 to 10% by weight.

In further embodiment, the hotmelt adhesive composition comprises a particulate phosphorous based compound and a room temperature liquid phosphorous based compound, wherein the phosphorous based compound is present in an amount of preferably 15 to 40% by weight, more preferably 20 to 35% by weight, even more preferably 25 to 32% by weight, and the room temperature liquid phosphorous based compound is present in an amount of preferably 4 to 15% by weight, more preferably 5 to 12% by weight, still more preferably 6 to 10% by weight.

In a preferred embodiment, the hotmelt adhesive composition comprises hindered amine light stabilizer, particulate phosphorous based compound and room temperature liquid phosphorous based compound, wherein the HALS is present in an amount of preferably 0.5 to 3% by weight, more preferably 0.5 to 2% by weight, the particulate phosphorous based compound is present in an amount of 15 to 40% by weight, more preferably 20 to 35% by weight, still more preferably 25 to 32% by weight, and the room temperature liquid phosphorous based compound is present in an amount of preferably 4 to 15% by weight, more preferably 5 to 12% by weight, even more preferably 6 to 10% by weight.

The propylene homopolymer (A) employed in the inventive hotmelt adhesives has a weight average molecular weight (Mw) of 20,000 to 145,000. Molecular weights are determined in accordance with the invention based on ASTM D 5396-11. In a preferred embodiment, the propylene homopolymer (A) has a weight average molecular weight (Mw) of 30,000 to 100,000, more preferably of 30,000 to 70,000. The propylene homopolymer (A) is obtained from a single-site catalyst and preferably has a polydispersity (Weight Average Molecular Weight (Mw)/Number Average Molecular Weight (Mn)) of 2.5 or less, more preferably of 2.4 or less.

Furthermore, the propylene homopolymer (A) may have a density measured according to ISO1183 of 0.85 to 0.89 g/cm$^3$. In preferred embodiments, the propylene homopolymer (A) has a density of 0.86 to 0.88 g/cm$^3$, more preferably 0.865 to 0.875 g/cm$^3$. The softening point of the propylene homopolymer (A) measured according to ISO 4625 may range from 80 to 130° C., such as 80 to 100° C. The melt flow rate of the propylene homopolymer (A) is not specifically limited and may e.g. range from 40 to 2,500 g/10 min, measured according to ASTM D 1238 at 230° C. under a load of 2.16 kg, preferably from 45 to 2,200 g/10 min. In addition, the propylene homopolymer (A) typically has a viscosity measured according to ASTM D 3236 at 190° C. of 4,000 to 380,000 mPa·s, more preferably 4,000 to 150,000 mPa·s, such as 5,000 to 75,000 mPa·s, or 5000 to 30,000 mPa·s.

Propylene homopolymers for use in the present invention are available on the market. Illustrative examples of suitable propylene homopolymers (A) include but are not limited to metallocene catalyzed propylene homopolymers of the L-MODU series marketed by Idemitsu, such as L-MODU 5400, L-MODU S600 or L-MODU 5901.

In a preferred embodiment of the present invention, the propylene homopolymer (A) is a mixture of a first propylene homopolymer (A1) and a second propylene homopolymer (A2). The first propylene homopolymer (A1) preferably has a softening point measured according to ISO 4625 of 85 to 100° C., such as 90 to 95° C. The melt flow rate of the first propylene homopolymer (A1) is not specifically limited and may range e.g. from 1,000 to 2,500 g/10 min, measured according to ASTM D 1238 at 230° C. under a load of 2.16 kg, such as 1,500 to 2,400 g/10 min or 1,800 to 2,200 g/10 min. The viscosity of the first propylene homopolymer (A1) measured according to ASTM D 3236 at 190° C. preferably ranges from 4,000 to 20,000 mPa·s, such as 4000 to 10,000 mPa·s. Furthermore, the first propylene homopolymer (A1) may have a weight average molecular weight (Mw) 20,000 to 60,000, such as 30,000 to 60,000.

The second propylene homopolymer (A2) according to this preferred embodiment may have a softening point measured according to ISO 4625 of 115 to 130° C. The melt flow rate of the second propylene homopolymer (A2) measured according to ASTM D 1238 at 230° C. under a load of 2.16 kg may range from 30 to 100 g/10 min, such as 40 to 80 g/10 min. The viscosity of the second propylene homopolymer (A2) is not specifically limited and may e.g. range from 300,000 to 380,000 mPa·s, measured according to ASTM D 3236 at 190° C., such as 320,000 to 370,000 mPa·s. The second propylene homopolymer typically has a higher molecular weight, such as a weight average molecular weight of 100,000 to 145,000, more preferably 110,000 to 140,000.

In some embodiments, the weight ratio of first propylene homopolymer (A1) to second propylene homopolymer (A2) according to this preferred embodiment typically is 1.5:1 to 4:1. In a more preferred embodiment, the weight ratio of first propylene homopolymer (A1) to second propylene homopolymer (A2) is 1.7:1 to 3:1.

According to the present invention, a propylene copolymer (B) is further employed in the mixture of polypropylenes. The polypropylene copolymer (B) is a propylene-ethylene copolymer and has an ethylene comonomer content of 5 to 25% by weight. Preferably, the propylene copolymer (B) has an ethylene comonomer content of 5 to 15%, more preferably of 8 to 14% by weight, even more preferably of 11 to 13% by weight. In one embodiment, the propylene copolymer (B) is a single-site catalyzed propylene copolymer.

The propylene copolymer (B) typically may have a density measured according to ISO 1183 of 0.85 to 0.89 g/cm$^3$, such as 0.860 to 0.870 g/cm³. Furthermore, the viscosity of the propylene copolymer (B) measured according to ASTM D 3236 at 190° C. may range e.g. from 500 to 20,000, from 1,000 to 15,000, from 2,000 to 10,000, or even from 4,000 to 9,000 mPa·s.

Single-site propylene-ethylene copolymers for use in the hotmelt adhesives of the invention are available on the market. Illustrative examples of suitable propylene copolymers (B) include but are not limited to metallocene catalyzed propylene-ethylene copolymers of the Vistamaxx series marketed by ExxonMobil, such as Vistamaxx 8380.

The mixture of the at least one single-site catalyzed propylene homopolymer (A), such as the mixture of first propylene homopolymer (A1) and second propylene homopolymer (A2) described above, and the at least one propylene copolymer (B) is employed in the inventive hotmelt adhesive compositions in an amount of 20 to 60% by weight, based on the total weight of the adhesive composition, preferably in an amount of 30 to 56% by weight, such as 32 to 55% by weight. The weight ratio of propylene homopolymer (A), such as the mixture of first propylene homopolymer (A1) and second propylene homopolymer (A2) described above, to propylene copolymer (B) in the hotmelt adhesive compositions of the invention is 1:3 to 3:1. In a preferred embodiment, the weight ratio of propylene homopolymer (A) to propylene copolymer (B) is 1:2 to 2:1. In a more preferred embodiment, the weight ratio of propylene homopolymer (A) to propylene copolymer (B) is 1:1 to 2:1

The hotmelt adhesive composition according to the present invention further comprises 15 to 45% by weight, based on the total weight of the hotmelt adhesive composition, of tackifying resins. In a preferred embodiment, the total amount of tackifying resin in the hotmelt adhesive composition is, 20 to 40% by weight, or even 25 to 38% by weight. Examples of the tackifying resin are known in the art and include e.g. materials which are composed of a rosin derivative resin, a polyterpene resin, a hydrocarbon resin, including modified hydrocarbon resins, an oil-soluble phenolic resin, or the like and are in the form of a solid, a semi-solid, or a liquid at normal temperature. In a preferred embodiment, the tackifying resin is a hydrocarbon resin, more preferably an aliphatic hydrocarbon resin, including modified aliphatic hydrocarbon resins, such as non-modified aliphatic hydrocarbon resins and aromatic modified aliphatic hydrocarbon resins. The at least one tackifying resin may have a softening point measured according to ASTM E-28 of e.g. 85 to 140° C., or even from 110° C. to 140° C. The glass transition temperature of the at least one tackifying resin is not specifically limited and may range e.g. from 40 to 80° C., measured according to ISO 11357-2.

In a preferred embodiment, the tackifying resin is a partially or fully hydrogenated hydrocarbon resin including aromatic modified hydrocarbon resins having an aromaticity measured by $^1$H-NMR of up to 15%. Tackifying resins for use in the present invention are available on the market. Illustrative examples include but are not limited to resins of the Escorez series, such as Escorez 5690, marketed by ExxonMobil, resins of the Arkon series, such as Arkon P-125, marketed by Arakawa, or resins of the Eastotac series, such as Eastotac H-130R, marketed by Eastman.

In a preferred embodiment, the tackifying resin is a mixture of at least one first tackifying resin (T1) and at least one second tackifying resin (T2). According to this preferred embodiment, the at least one first tackifying resin (T1) may have a softening point measured according to ASTM E-28 of 105 to 140° C., or even 120 to 135° C. The glass transition temperature of the first tackifying resin (T1) is not specifically limited and may range e.g. 70 to 80° C., measured according to ISO 11357-2. In a preferred embodiment, the first tackifying resin (T1) is a hydrocarbon resin, more preferably, an aliphatic hydrocarbon resin, such as a non-modified aliphatic hydrocarbon resin. A single first tackifying resin (T1) or a combination of two or more tackifying resins (T1) may be used according to the present invention.

The second tackifying resin (T2) according to this preferred embodiment may have a softening point measured according to ASTM E-28 of e.g. 80 to 100° C., or even 80 to 95° C. The second tackifying resin e.g. may be an aromatic modified hydrocarbon resin, such as cycloaliphatic hydrocarbon resin having an aromaticity measured by $^1$H-NMR of 5 to 15 mol %. The glass transition temperature of the second tackifying resin is not specifically limited and may range e.g. from 40 to 50° C., measured according to ISO 11357-2. In a preferred embodiment, the second tackifying resin (T2) is a hydrocarbon resin, more preferably an aliphatic hydrocarbon resin, still more preferably an aromatic modified aliphatic hydrocarbon resin.

The weight ratio T1/T2 of total first tackifying resin (T1) to second tackifying resin (T2) in this preferred embodiment is preferably 0.8 to 2, more preferably 1 to 1.8.

The hotmelt adhesive composition according to the present invention may further comprise a functionalized polyolefin. The functionalized polyolefin can be a functionalized polyolefin wax. The term "functionalized polyolefin" is used herein to refer to polyolefins having polar functional groups, such as maleic anhydride-modified polypropylene and maleic anhydride-modified polypropylene wax. An illustrative commercially available functionalized polyolefin wax is Honeywell AC-596P. AC-596P is polypropylene-maleic anhydride copolymer from Honeywell. The functionalized polyolefin is preferably present in the inventive hotmelt adhesive in an amount of up to 5%, preferably up to 4% by weight, preferably 0.5 to 3% by weight, more preferably 0.5 to 2% by weight, based on the total weight of the composition.

Alternatively or in addition to the functionalized polyolefin wax, the hotmelt adhesive composition according to the present invention may include a Fischer-Tropsch wax. Fischer-Tropsch waxes are synthetic waxes that are composed of hydrocarbons and produced using the Fischer-Tropsch method. In various embodiments the Fischer-Tropsch waxes are synthetic paraffins. These Fischer-Tropsch waxes, in contrast to products originating from mineral oil, are composed predominantly of unbranched n-alkanes. Fischer-Tropsch waxes suitable in accordance with the present invention are known in the art and are commercially available. An illustrative example thereof includes e.g. Shell GTL Sarawax SX 105 marketed by Evonik. The hotmelt adhesive composition may include further components in minor amounts. For example, polymers such as a crystalline polypropylene having a density of more than 0.89 g/cm³ may be used for adjusting the crystallization behavior. Suitable polypropylene include e.g. propylene homopolymers having a melt flow rate MFR (230° C./2.16 kg) in the range of 20 to 90 g/10 min. Such component may be employed in an amount of up to 2% by weight, based on the total weight of the hotmelt adhesive composition, such as in an amount of up to 1% by weight. Crystallization improvers are known in the art and are commercially available. An illustrative example suitable according to the invention includes Moplen HP648T, marketed by LyondellBasell.

The hotmelt adhesive composition according to the invention can be formulated without the use of plasticizers. It has to be noted, however, that the room temperature liquid phosphorous based compound may have some plasticizing effect. Apart from that, the use of a plasticizer as a separate component in addition to those components discussed above is not necessary according to the present invention. Thus, the present invention also includes hotmelt adhesive compositions being free from plasticizers as a separate, additional component.

In one embodiment, the hotmelt adhesive composition comprises, based on the total weight of the composition:
- (i) 20 to 40% by weight, preferably 25 to 38% by weight of the at least one tackifying resin,
- (ii) 20 to 60% by weight, preferably 30 to 56% by weight of the mixture of at least one single-site catalyzed propylene homopolymer (A) and at least one propylene copolymer (B), wherein the weight ratio of propylene homopolymer (A) to propylene copolymer (B) is 1:1 to 2:1;
- (iii) at least two components selected from the following three components (a) to (c):
  - (a) an encapsulated ammonium polyphosphate in an amount of 20 to 35% by weight, preferably 25 to 30% by weight of,
  - (b) the hindered amine light stabilizer in an amount of 0.5 to 2% by weight of, and
  - (c) the room temperature liquid phosphorous based compound in an amount of 5 to 12% by weight, preferably 6 to 10% by weight,
- (iv) 0.5 to 2% by weight of maleic anhydride modified polypropylene, and
- (v) 0.5 to 2% by weight of Fischer-Tropsch wax, wherein the composition is halogen-free.

The hotmelt adhesive composition according to the present invention may have a Brookfield viscosity measured according to ASTM D 3236 at 180° C. of 2,000 to 50,000 mPa·s, such as 5,000 to 40,000 mPa·s. Furthermore, the hotmelt adhesive composition preferably has a softening point measured according to ASTM E 28 of 95 to 140° C.

The hotmelt adhesive may further contain usual additives such as stabilizers or antioxidants in minor amounts. The hotmelt adhesive of the present invention can be produced as known in the art, e.g. by dry blending the tackifying resin, the mixture of at least one single-site catalyzed propylene homopolymer (A) and at least one propylene copolymer (B), and optionally the functionalized polyolefin and additives using e.g. a Henschel mixer or the like, and melt-kneading the components using a single-screw or twin-screw extruder, a Plast mill, a Banbury mixer, or the like.

The present invention also relates to an article comprising a first base material and a second base material and a layer of the inventive hotmelt adhesive composition in-between the first and second base material.

Suitable base materials can be selected from a variety of substrates in various applications, especially where a fire retardant behavior is required. The adhesive formulations described herein, provide a desired combination of physical properties such as stable adhesion over time, indicative of broad application temperature ranges, and a long open time and therefore can be used in a multiplicity of applications. Therefore, the first or second base materials can include a large variety of materials, which include, but are not limited to lumber, wood, veneer, fiberboard, chipboard, plasterboard, perlite slabs, gypsum, wallboard, plywood, metal (e.g. aluminum, zinc plated steel, galvanized steel sheet, etc.), a variety of fiber substrates, Rockwool, a variety of thermoplastic polymers in several forms (which include, but are not limited to PP, PE, PVC, ABS, PS, PES, PU), or textile.

In one embodiment, at least one of the first or second base material is a thermoplastic polymer, preferably is a polypropylene (PP), polyethylene (PE), polyvinyl chloride (PVC), acrylonitrile butadiene styrene (ABS) polymer, polystyrene (PS), polyether sulfone (PES), or polyurethane (PU). In another embodiment, both the first and the second substrate are selected from a thermoplastic polymer. For example, one of the first or second base material may be selected from PS, including expanded polystyrene (EPS) or extruded polystyrene foam (XPS).

Furthermore, both the first and second base material may be selected from PS, including expanded polystyrene (EPS) or extruded polystyrene foam (XPS).

The present invention further provides a method of bonding a first base material to a second base material, the method comprising the steps of melting the hotmelt adhesive according to the invention, coating the adhesive on at least one base material, and bonding the other base material to the coated hotmelt adhesive. The first and second base material may be selected from those described above.

The hotmelt adhesive is suited for several areas of application, especially where a fire retardant behavior of the bonding line is required, which include, but are not limited to laminations of assembled elements, such as laminations in woodworking applications, like production of doors, window frames and sills, panels and flooring elements, production of walls or panels specially designed for the navy industry, construction elements, lamination of automotive and caravan elements, bonding of several generic substrates, or coating of several substrates, including textiles. The hotmelt adhesive of the present invention also may be used for adhering or laminating polystyrene materials such as polystyrene insulation panels.

The following reference, comparative and inventive examples further illustrate the present invention.

EXAMPLES

Methods:
Brookfield viscosity is determined according to ASTM D 3236 at 150° C. (or 180° C. where indicated) using spindle 27 at 20 rpm.

The softening point is determined according to ASTM E 28-99.

Open time refers to the period of time between the application of glue in, at least, one of the surfaces to be bonded and the joining of the parts, followed by the application of pressure, during which the glue surfaces are exposed to air before being put in contact with the other surfaces and during which a satisfactory connection can still be achieved. The open time is determined at 160° C. (or 180° C. were indicated) according to a H. B. Fuller internal method in reference examples, comparative examples and inventive example alike. Internal H. B. Fuller method refers to an application with a hot-melt gun of a hotmelt string with a thickness of 1 to 2 mm in a base of white cardboard with 240 g/m$^2$ (thickness of the cardboard of 0.27 mm), followed by the application, in regular time intervals, of cardboard strips (same cardboard as the base), with manual press. The open time is considered finished when the paper strip is pulled without substrate rupture. Rounded values in minutes are reported in table 1 below.

Shear Adhesion Failure Temperature (SAFT) is determined according to ASTM D 4498-07; wherein the test conditions are based on the bonding of an unprimed PVC with a thickness of 0.4 mm to beech wood; the bonding area is 2.5×2.5 cm$^2$; at a temperature rate of 5° C./15 min; and a weight of 445 g.

Torque is determined in the heating curve of an oscillation temperature sweep test with a Bohlin rheometer, with a parallel plate 20 mm, at a frequency 1 Hz, a gap 0.5 mm, a target strain of 0.01 and a temperature rate of 4° C./min.

Bonding strength is determined in a Lloyd LR 5K dynamometer, with a pulling speed of 10 mm/min and with the bonded material at a temperature of 60° C.; extruded polystyrene (XPS) materials (thickness: 3.0 cm) previously bonded with the hotmelt adhesive, with an amount of approx. 50 g/m$^2$, at 160° C., with a bonding area of 9.5×4.0 cm$^2$, consolidation of 24 hours at room temperature followed by a condition of the bonded material at 60° C. for 18 hours.

Material cohesion failure is done by visual analysis. The results are reported in %, which refers to the percentage of area with material cohesive failure when pulled at 60° C. in a dynamometer.

Ignitability is determined according to adapted EN ISO 11925-2, by subjecting the specimen to direct impingement of a small flame. The test specimen is attached vertically on a shaped specimen holder. A propane gas flame is brought into contact with the specimen. A cotton batting is placed beneath the specimen holder to monitor the falling of flaming debris. The reported result refer to average values. The occurrence of smoke or black particle is indicated in table 2 below as follows:

1: low
2: medium
3: high

Density is determined according to ISO 1183.

Shore A hardness is determined according to DIN ISO 7619-1

Materials:

Vestoplast® 703 and 608 are amorphous poly-alpha-olefin (APAO) polymers available from Evonik.

Aerafin™ 180 is a propylene-based olefin polymer available from Eastman.

Polybutene-1 DP8911M is a random copolymer of 1-butene with high ethylene content from available from LyondellBasell.

L-MODU S400 is a metallocene catalyzed propylene homopolymer having a softening point of 93° C., available from Idemitsu.

L-MODU S901 is a metallocene catalyzed propylene homopolymer having a softening point of 120° C., available from Idemitsu.

Vistamaxx 8380 is a metallocene catalyzed propylene copolymer having an ethylene content of 12% by weight, available from ExxonMobil.

Arkon P-125 is a hydrogenated aliphatic hydrocarbon resin from Arakawa Technical having a softening point of 125° C.

Moplen™ HP648T is a polypropylene homopolymer from LyondellBasell.

Escorez™ 5690 is an aromatic modified hydrogenated hydrocarbon resin from ExxonMobil having a softening point of 90.5° C.

Escorez™ 5400 is a hydrogenated DCPD resin from ExxonMobile having a softening point of 103.4° C.

Eastotac™ H-130R is a hydrogenated hydrocarbon resin from Eastman having a softening point of 130° C.

A-C 596P is a polypropylene maleic anhydride copolymer from Honeywell.

Shell GTL Sarawax SX 105 is a Fischer-Tropsch wax from Evonik.

Addiflam® pow APP F2M is micro-encapsulated ammonium polyphosphate phase II from CTF-2000.

Aflammit® PLF 710 is a cyclic phosphonate based room temperature flame retardant from Thor.

Hostavin NOW® XP is a hindered amine light stabilizer (HALS) from Clariant.

DP-45™ is a halogenated fire retardant from Lanxess

Alfrimal 446 is an aluminum hydroxide from Alpha® Calcit.

Saficire Triox Powder is an antimony trioxide powder from Safic Alcan.

Additives:

Irganox® 1010 is a sterically hindered phenolic antioxidant from BASF.

Irgafos® 168 is a di-tertiary butyl phenyl phosphite from BASF.

Reference Examples

Reference examples (RE) including a reference amount of fire retardants were prepared for finding compositions providing the required adhesive behavior even in the presence of major amount of non-adhesive material. The reference examples were obtained by mixing the components according to the following table 1. In table 1, the amounts of components are given in percent by weight, based on the total weight of the hotmelt adhesive composition.

TABLE 1

|  | RE1 | RE2 | RE3 | RE4 | RE5 | RE6 |
| --- | --- | --- | --- | --- | --- | --- |
| Vestoplast 703 | 10.00 |  |  |  |  |  |
| Vestoplast 608 | 6.10 |  |  |  |  |  |
| Aerafin 180 | 8.00 |  |  |  |  |  |
| Polybutene-1 DP8911M | 2.50 |  |  |  |  |  |
| L-MODU S400 |  | 15.00 | 20.00 | 20.00 | 20.00 | 20.00 |
| Vistamaxx 8380 |  | 11.20 | 15.00 | 15.00 | 15.00 | 15.00 |
| Moplen HP 468 T |  | 0.40 | 0.45 | 0.45 | 0.45 | 0.45 |
| Arkon P-125 | 12.00 | 12.00 | 12.55 | 11.35 | 11.35 | 11.75 |
| Escorez 5690 | 10.00 | 17.80 | 17.80 | 14.00 | 14.00 | 15.00 |
| Escorez 5400 |  |  |  | 5.00 |  |  |
| Eastotac H-130R |  |  |  |  | 5.00 | 5.00 |
| A-C 596P | 1.00 | 1.40 | 1.40 | 1.40 | 1.40 | 1.40 |
| Shell GTL Sarawax SX 105 |  |  |  |  |  |  |
| Alfrimal 446 | 49.00 | 49.00 |  |  |  |  |
| Addiflam pow APP F2M |  |  | 30.00 | 30.00 | 30.00 | 30.00 |

TABLE 1-continued

|  | RE1 | RE2 | RE3 | RE4 | RE5 | RE6 |
|---|---|---|---|---|---|---|
| Additives | 1.40 | 1.40 | 1.40 | 1.40 | 1.40 | 1.40 |
| Viscosity [mPa · s] | 43000 | 48000 | <7000* | 7200* | 7100* | 8000* |
| Softening point [° C.] | 126 | 125 | 115 | 102 | 104 | 103 |
| Open time [min] | 6 | 1 | 3* | 8* | 9* | 19* |
| SAFT [° C.] | 90 | 85 | 85 | 85-90 | 85 | 85 |
| Torque at 60° C. [10⁻² Nm] | 0.90 | 4.19 | 3.50 | 2.35 | 3.21 | 1.36 |
| Bonding strength at 60° C. [N/cm²] | 1.74 | 4.33 | 1.7 | 2.12 | 2.65 | 2.42 |
| Material cohesion failure [%] | 2.5 | 17.5 | 17.5 | 23.5 | 50 | 25 |

*at 180° C.

The flame retardance of comparative example CE1 in table 2 below providing insufficient flame resistance is used in reference examples RE1 and RE2. Reference examples RE3 to RE6 are inventive examples in accordance with the present invention. Reference examples RE2 to RE6, especially RE3 to RE6 in accordance with the invention, exhibit an improved balance of adhesive properties, including at the same time a suitable viscosity, a lower softening point, a long open-time, good bonding quality and good torque at elevated temperature, and high SAFT.

Moreover, further inventive examples according to the invention (IE) and comparative examples (CE) for testing flame retardant properties were prepared by mixing the components according to the following table 2. In table 2, the amounts are again given in percent by weight, based on the total weight of the hotmelt adhesive composition.

In CE1 of the below table 2, flame retardant properties are low. Better flame retardant properties can be achieved in CE2 only with the use of a halogen based flame retardant. Acceptable flame resistance is achieved according to the inventive examples IE1 to IE6, in particular especially good results in IE2 to IE6. No halogen-containing compounds are used in IE1 to IE6.

What is claimed is:

1. A hotmelt adhesive composition comprising, based on the total weight of the composition:
   from 15% to 45% by weight at least one tackifying resin;
   from 20% to less than 60% by weight a mixture of at least one single-site catalyzed propylene homopolymer (A) and at least one propylene copolymer (B); and
   at least one of the following two components:
      a particulate phosphorous based compound in an amount from 15% to 40% by weight, and
      a room temperature liquid phosphorous based compound in an amount from four % to 15% by weight,
   wherein the propylene homopolymer (A) has a weight average molecular weight from 20,000 to 145,000, the propylene copolymer (B) has an ethylene comonomer content in an amount from five % to 25% by weight, and the weight ratio of propylene homopolymer (A) to propylene copolymer (B) is from 1:3 to 3:1.

2. The hotmelt adhesive composition of claim 1, wherein the particulate phosphorous based compound is a polyphosphate.

3. The hotmelt adhesive composition of claim 1, wherein the particulate phosphorous based compound is ammonium polyphosphate.

TABLE 2

|  | CE1 | CE2 | IE1 | IE2 | IE3 | IE4 | IE5 | IE6 |
|---|---|---|---|---|---|---|---|---|
| L-Modu S400 | 14.40 | 25.00 | 20.00 | 20.00 | 28.00 | 13.00 | 28.00 | 14.00 |
| L-Modu S901 |  |  |  |  |  | 7.00 |  | 5.00 |
| Vistamaxx 8380 | 10.60 | 20.00 | 15.00 | 15.00 | 22.00 | 14.00 | 28.00 | 14.00 |
| Moplen HP 468 T | 0.60 | 0.60 | 0.45 | 0.45 | 0.60 | 0.45 | 0.60 | 0.50 |
| Arkon P-125 | 9.00 | 15.50 | 12.35 | 12.35 | 15.00 | 10.35 | 15.00 | 10.50 |
| Escorez 5690 | 13.00 | 16.50 | 14.00 | 14.00 | 16.00 | 10.5 | 16.00 | 10.50 |
| Eastotac H-130R |  | 5.80 | 5.00 | 5.00 | 5.80 | 5.00 | 5.80 | 7.00 |
| A-C 596P | 1.00 | 1.60 | 1.40 | 1.40 | 1.60 | 1.40 | 1.60 | 1.40 |
| Shell GTL Sarawax SX 105 | 1.00 | 1.60 | 1.40 | 1.40 | 1.60 | 1.40 | 1.60 | 1.20 |
| Alfrimal 446 | 49.0 |  |  |  |  |  |  |  |
| Addiflam pow APP F2M |  |  | 30.0 | 28.50 |  | 27.50 |  | 27.50 |
| Hostavin NOW XP |  |  |  | 1.50 | 1.00 | 1.00 |  |  |
| DP-45 |  | 10.00 |  |  |  |  |  |  |
| Saficire Triox Powder |  | 3.00 |  |  |  |  |  |  |
| Aflammit PLF 710 |  |  |  |  | 8.00 | 8.00 | 8.00 | 8.00 |
| Additives | 1.40 | 0.40 | 0.40 | 0.40 | 0.40 | 0.40 | 0.40 | 0.40 |
| Burning time after flame application* [s] | 2.5 | 1 | 2 | 1 | −1 | 0 | −1 | 0 |
| Flame size with Bunsen burner [cm] | 8 | 7 | 9 | 9 | 7 | 6 | 5 | 7 |
| Flame size after Bunsen burner [cm] | 2 | 1 | 3 | 1 | 0 | 0 | 0 | 0 |
| Dripping | yes | no | yes | no | no | no | 1 in 3 | no |
| Ignition of cotton batting | yes | no | yes | no | no | no | yes** | no |
| Time to start dripping* [s] | −1.5 | — | 1 | — | — | — | 0** | — |
| Smoke and black particles | 2-3 | 2 | 2 | 1-2 | 1 | 1 | 2 | 1 |

*negative values refer to test conditions before removing the Bunsen burner

**when dripped

4. The hotmelt adhesive composition of claim 1, wherein the particulate phosphorous based compound is encapsulated ammonium polyphosphate.

5. The hotmelt adhesive composition of claim 1, wherein the particulate phosphorous based compound is ammonium polyphosphate encapsulated with melamine.

6. The hotmelt adhesive composition of claim 1, wherein the room temperature liquid phosphorous based compound has a phosphorous content from eight % to 25% by weight.

7. The hotmelt adhesive composition of claim 1, wherein the room temperature liquid phosphorous based compound is at least one from the group of phosphonates, phosphate esters, phosphine, phosphine oxide, and phosphates.

8. The hotmelt adhesive composition of claim 1, wherein the room temperature liquid phosphorous based compound is a cyclic phosphonate.

9. The hotmelt adhesive composition of claim 1, further comprising a hindered amine light stabilizer in an amount from 0.5% to three % by weight.

10. The hotmelt adhesive composition of claim 1, wherein the hotmelt adhesive composition includes the particulate phosphorous based compound in an amount from 15% to 40% by weight, based on the total weight of the composition.

11. The hotmelt adhesive composition of claim 1, wherein the hotmelt adhesive composition includes the room temperature liquid phosphorous based compound in an amount from four % to 15% by weight, based on the total weight of the composition.

12. The hotmelt adhesive composition of claim 1, wherein the composition further comprises a functionalized polyolefin.

13. The hotmelt adhesive composition of claim 1, wherein the composition further comprises a wax.

14. The hotmelt adhesive composition of claim 1, wherein the propylene homopolymer (A) has at least one of:
  a density measured according to ISO 1183 from 0.85 to 0.89 g/cm$^3$;
  a softening point measured according to ISO 4625 from 80° C. to 100° C.;
  a viscosity measured according to ASTM D 3236 at 190° C. from 4,000 to 380,000 mPa·s;
  a weight average molecular weight from 30,000 to 100,000; and
  a molecular weight distribution (Mw/Mn) of 2.5 or less.

15. The hotmelt adhesive composition of claim 1, wherein the propylene copolymer (B) has at least one of:
  an ethylene comonomer content from five % to 14% by weight;
  a density measured according to ISO 1183 from 0.85 to 0.89 g/cm$^3$; and
  a viscosity measured according to ASTM D 3236 at 190° C. from 1,000 to 15,000 mPa·s.

16. The hotmelt adhesive composition of claim 1, wherein the tackifying resin comprises at least one of the following:
  is a hydrogenated hydrocarbon resin;
  has a softening point measured according to ASTM E-28 from 85° C. to 140° C.; and
  has an aromaticity measured by $^1$H-NMR of up to 15%.

17. The hotmelt adhesive composition of claim 1, wherein the tackifying resin is a mixture of at least one first tackifying resin (T1), and a second tackifying resin (T2), wherein
  the at least one first tackifying resin (T1) has a softening point measured according to ASTM E-28 from 105° C. to 140° C., and
  the second tackifying resin (T2) has a softening point measured according to ASTM E-28 from 80° C. to 100° C. and an aromaticity measured by $^1$H-NMR from five % to 15%, and
  the weight ratio T1/T2 of first tackifying resin (T1) to second tackifying resin (T2) is from 0.8 to two.

18. The hotmelt adhesive composition of claim 1, wherein
  the propylene homopolymer (A) is a mixture of a first propylene homopolymer (A1) and a second propylene homopolymer (A2),
  the first propylene homopolymer (A1) has a softening point measured according to ISO 4625 from 85° C. to 100° C., a viscosity measured according to ASTM D 3236 at 190° C. from 4,000 to 20,000 mPa·s and a weight average molecular weight (Mw) from 20,000 to 60,000;
  the second propylene homopolymer (A2) has a softening point measured according to ISO 4625 from 115° C. to 130° C., a melt flow rate measured according to ASTM D 1238 at 230° C. under a load of 2.16 kg from 30 to 100 g/10 min, and a weight average molecular weight from 100,000 to 145,000; and
  the weight ratio of first propylene homopolymer (A1) to second propylene homopolymer (A2) is from 1.5:1 to 4:1.

19. The hotmelt adhesive composition of claim 1, wherein the composition comprises, based on the total weight of the composition
  from 20% to 40% by weight the at least one tackifying resin;
  from 20% to 60% by weight the mixture of at least one single-site catalyzed propylene homopolymer (A) and at least one propylene copolymer (B);
  from 0.5% to two % by weight maleic anhydride modified polypropylene;
  from 0.5% to two % by weight Fischer-Tropsch wax; and
  at least two components selected from the following three components:
    an encapsulated ammonium polyphosphate in an amount from 20% to 35% by weight;
    a hindered amine light stabilizer in an amount from 0.5% to two % by weight, and
    the room temperature liquid phosphorous based compound in an amount of from five % to 12%, and
  wherein the composition is halogen-free.

20. The hotmelt adhesive composition of claim 1, wherein the composition has
  a Brookfield viscosity measured according to ASTM D 3236 at 180° C. from 2,000 to 50,000 mPa·s; and
  a softening point measured according to ASTM E 28 from 95° C. to 140° C.

* * * * *